(12) United States Patent
Blanc

(10) Patent No.: US 7,120,957 B2
(45) Date of Patent: Oct. 17, 2006

(54) LAST WITH GRIP DEVICE FOR SHOEMAKING

(75) Inventor: Roger Blanc, Le Pin (FR)

(73) Assignee: Etablissments Actis, Lepin (FR)

( * ) Notice: Subject to any disclaimer, the term of this patent is extended or adjusted under 35 U.S.C. 154(b) by 0 days.

(21) Appl. No.: 10/497,488

(22) PCT Filed: Dec. 3, 2002

(86) PCT No.: PCT/FR02/04160

§ 371 (c)(1),
(2), (4) Date: Dec. 20, 2004

(87) PCT Pub. No.: WO03/047379

PCT Pub. Date: Dec. 6, 2003

(65) Prior Publication Data
US 2005/0091765 A1    May 5, 2005

(30) Foreign Application Priority Data
Dec. 3, 2001    (FR) .................................. 01 15607

(51) Int. Cl.
*A43D 3/00*    (2006.01)

(52) U.S. Cl. ............... 12/133 R; 12/133 M; 12/128 F; 12/123

(58) Field of Classification Search ............. 12/133 R, 12/133 A, 133 M, 128 F, 128, 123
See application file for complete search history.

(56) References Cited

U.S. PATENT DOCUMENTS

| | | | | | |
|---|---|---|---|---|---|
| 1,282,258 | A | * | 10/1918 | Merritt ..................... | 12/133 R |
| 1,320,202 | A | * | 10/1919 | Tusa ......................... | 12/133 R |
| 3,228,048 | A | * | 1/1966 | Merritt ..................... | 12/133 R |
| 5,054,147 | A | * | 10/1991 | Motsch ..................... | 12/133 R |
| 5,881,413 | A | * | 3/1999 | Throneburg et al. ...... | 12/133 B |

FOREIGN PATENT DOCUMENTS

| | | |
|---|---|---|
| DE | 3625901 A1 | 2/1988 |
| FR | 1 324 108 A | 4/1963 |
| FR | 2 135 693 | 12/1972 |
| FR | 2 586 909 | 3/1987 |
| FR | 2 705 872 | 12/1994 |

* cited by examiner

*Primary Examiner*—Marie Patterson
(74) *Attorney, Agent, or Firm*—Oliff & Berridge, PLC

(57) ABSTRACT

The invention concerns a last serving as template for making shoes, designed for use in an automatic or semi-automatic shoemaking installation. It is provided with a grip device, enabling it to be gripped and/or immobilized by external complementary members, such as the jaws of a manipulator robot's clamp. The last is produced as a part initially cast in synthetic material. An insert is embedded in the material of said part and designed to receive the elements of the grip device. Said elements serve as support and reference for machining the cast part, so as to obtain the final configuration of the last.

5 Claims, 2 Drawing Sheets

LAST WITH GRIP DEVICE FOR SHOEMAKING

The present invention relates to a last with a grip device, for manufacturing footwear, and more particularly a last designed for use in an automatic or semi-automatic footwear manufacturing installation.

In footwear manufacturing, the use is generally known of special wooden or synthetic templates, called "lasts", which reproduce the various characteristics of the foot: the size, whether it is the left or right foot, and the type and appearance of the corresponding item of footwear to be made. It is on the last that the "upper" is fashioned first, that the sole part called the "insole" is then put in place, and that most of the other footwear manufacturing operations, such as roughing and bonding are also carried out, the item of footwear thus being built around the last.

Conventionally, footwear manufacturing operations are performed manually, each last bearing an upper in the course of manufacture being manually transported from one machine to the next. However, automatic or semi-automatic footwear production lines are also known in which a chain, conveying trays or pallets bearing the lasts, bring them one after the other to a number of workstations located on the chain itself or alongside this chain, subsequent manufacturing or treatment operations then being carried out on the footwear at these stations.

In such installations, the lasts must be positioned precisely on the trays or pallets. Furthermore, these lasts must be capable of being transferred, using handling robots, between warehouses for storing these lasts and the production line itself, or between the conveyor chain and machines located alongside said chain. The lasts must also be able to be immobilized in precisely indexed positions.

For this purpose, it is already known to provide, on each last to be manipulated, a grip device called a "grip", designed so as to be able to be gripped by a clamp with suitably shaped jaws, borne for example on the end of the articulated arm of a manipulator robot. The grip thus makes it possible to handle the last, in other words to take it, place it and lock it in a known three-dimensional position. Examples of embodiments of such a grip are described in French patents No. 2 586 909 and No. 2 705 872. In particular, the latter document depicts a grip comprising two parallel tubular hourglass-shaped elements, connected to one another by a plate. These tubular elements make it possible not only for the last to be grasped by the clamp of a manipulator robot, but also to precisely position the last on a tray or pallet, provided with two upwardly projecting pins, the two tubular elements of the grip of the last respectively fitting over the two pins.

The existing grips, such as those described in the two abovementioned French patents No. 2 586 909 and No. 2 705 872, are fastened to the lasts by screwing. In particular, in the case of the known grip comprising two parallel tubular elements, these two elements are partially threaded and are inserted in two through holes in the last, where they are retained by nuts that are screwed onto their respective threads. This method of attachment between each last and its grip requires several operations, in particular piercing of the lasts or other alterations, and assembly operations, which are relatively expensive. Above all, this method of attachment gives rise to inaccuracies in the position of the grip with respect to the body of the corresponding last, in particular when the usual method of manufacturing lasts is taken into account.

Specifically, lasts are conventionally made starting with a block, for example of wood. The overall shape of the last is obtained by machining this block on a copying lathe and then the ends of the last (which were used to keep it on the lathe) are cut by hand, this operation not being very precise. The last must then be repositioned on a template, to machine its surface that will receive the grip, and lastly the holes for fastening the grip are pierced in the last, it being very difficult to pinpoint the positions of these holes. Thus, there are many causes of inaccuracies and the errors compound one another.

Since the grip in turn serves as a reference for the positioning of the last on the manipulator robot or on the trays on the footwear production line, it can be seen how these inaccuracies can lead to poor positioning of the last itself when an item of footwear is being made on this last, giving rise to manufacturing errors or problems and, in all cases, insufficient reproducibility.

The present invention aims to overcome these drawbacks, by providing a different method of attachment between the last itself and its grip, ensuring a substantial improvement in the accuracy of positioning the grip with respect to the last and, consequently, better quality of manufacture of the footwear itself.

For this purpose, the subject of the invention is essentially a last for manufacturing footwear, provided with a grip device so that it can be grasped and/or immobilized by complementary external members, the last being made as an initially cast part, in particular of resin, with an insert embedded in the material of this part and designed to receive the elements of the grip device.

Preferably, the elements of the grip device attached to the insert are used as a support and spatial reference for machining the cast part so as to obtain the definitive shape of the last. Advantageously, the upper surface of the insert is level with the upper surface of the body of the last, this upper surface serving as a support surface for the grip device, ensuring a precise heightwise reference.

Thus, the inventive concept consists in casting the constituent material of the last blank in a mold, around an insert put in place beforehand, which will receive the grip, such that this grip is already in place before the machining operation to finish the last, which will give it its definitive geometry. The grip can then serve as a support and spatial reference for the final machining of the last.

In this way, there is no need to pierce holes in the last to fasten the grip, and the inaccuracies inherent in such a fastening are also eliminated. Furthermore, having the grip already in place before machining makes it possible to hold the last so that it can be machined, thus avoiding having to hold the last by its ends, offering an extremely precise three-dimensional reference for machining. All alteration operations are thereby avoided.

Great reproducibility of the geometry of the lasts is thus achieved for a given type of footwear, all the lasts produced being perfectly interchangeable. The great precision achieved also facilitates digitization, in particular when increasing sizes.

The invention will be more clearly understood with the aid of the description that follows, with reference to the diagrammatic drawing attached which shows, by way of example, an embodiment of this last with a grip device, and also illustrates how this last may be obtained.

Figure 4:
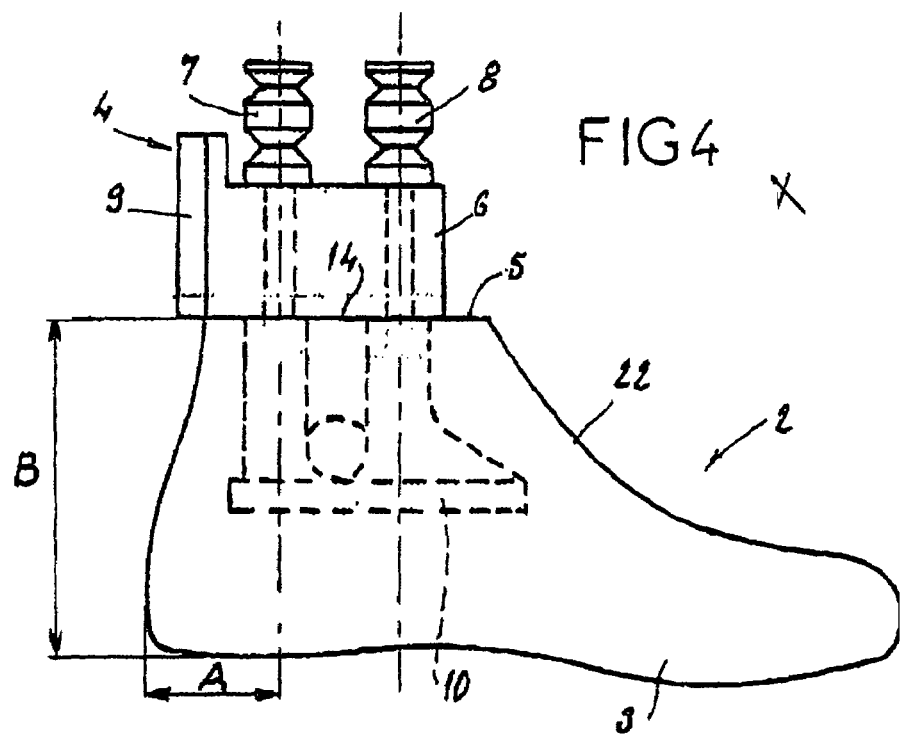
FIG. 4 is a side view of the last, in its final state.

Referring first to FIG. 4, the last for manufacturing footwear, designated overall with the reference 2, comprises on the one hand a body 3, and on the other a grip device or "grip" 4. The body 3 of the last, made of resin, reproduces the characteristics of a foot, so as to serve as a template during the manufacture of an item of footwear. The grip 4, projecting upward from the upper surface 5 of the body 3 of the last 2, is used for manipulating and immobilizing the last 2. In the example illustrated, this grip 4 comprises, on the one hand, a plate or elongate block 6, applied to the upper surface 5 of the body 3 of the last 2, and on the other hand, two elongate tubular elements 7 and 8 that are mutually parallel and perpendicular to the upper surface 5 of the body 3, the upper parts of the two elements 7 and 8 being hourglass-shaped. To the rear, the block 6 bears an encoding cell 9 (this grip structure is known per se from French patent No. 2 705 872).

To attach the grip 4 to the body 3 of the last 2, an insert 10 is embedded in the material of the body 3.

Figure 1:
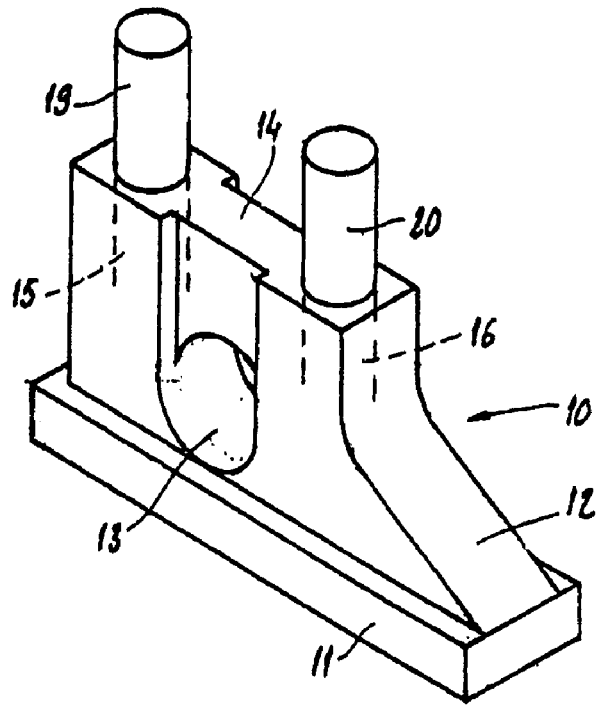
FIG. 1 is a perspective view of the insert, to be embedded in the cast material of the last.

The insert 10, depicted on its own in FIG. 1, is a metal part comprising a base 11 on which is mounted a vertical flange 12 through which there passes a central aperture 13. The upper surface 14 of the flange 12 is pierced with two parallel tapped holes 15 and 16 that extend on either side of the aperture 13. The two tapped holes 15 and 16 are designed to receive the threaded lower ends of the two elongate elements 7 and 8 of the grip 4, these elements 7 and 8 passing through the block 6 of the grip 4 and projecting out below said block 6. The upper surface 14 of the flange 12, and hence the insert 10, is level with the upper surface 5 of the body 3 of the last 2.

Figure 2:
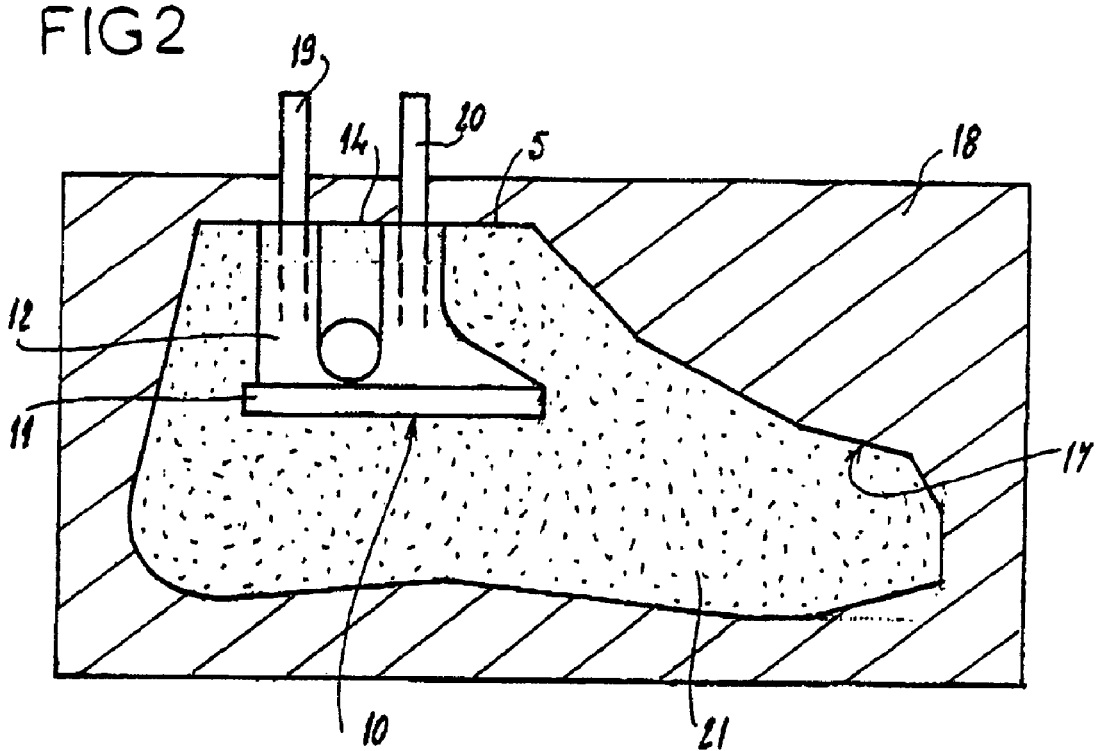
FIG. 2 is a sectional view illustrating the operation of casting this material.

To produce such a last 2, the above-described insert 10 is placed inside the cavity 17 of a mold 18, the insert 10 possibly being held in place by threaded rods 19 and 20, screwed respectively into its two tapped holes 15 and 16 (see FIG. 2). The resin 21 intended to constitute the body 3 of the last 2 is poured into the cavity 17 of the mold 18, so as to embed the insert 10. The shape of the insert 10 ensures that it will be perfectly well anchored in the cast material 21.

Figure 3:
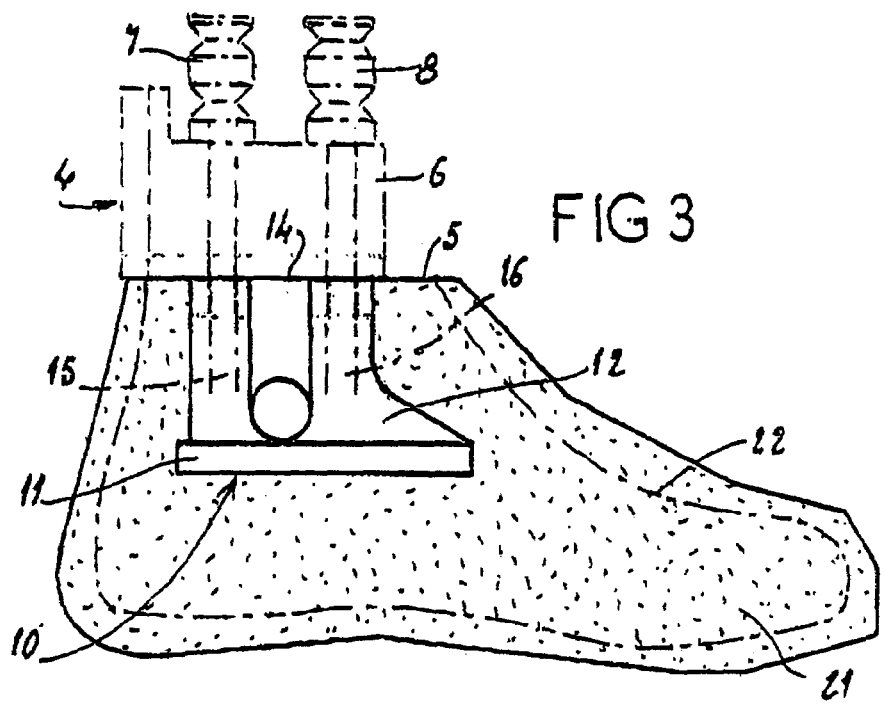
FIG. 3 is another sectional view illustrating the operation of final machining of the last.

After the resin has cured 21, the cast part obtained, constituting a blank for the last 2, is removed from the mold. The threaded rods 19 and 20 are then removed by unscrewing, and the grip 4 is put in place, by screwing its two elongate elements 7 and 8 into the two tapped holes 15 and 16 in the insert 10 in replacement for the abovementioned threaded rods 19 and 20 (see FIG. 3).

The grip 4 thus in place, the two elongate elements 7 and 8 of this grip 4, now attached to the insert 10, are used as a support and spatial reference for a machining operation on the last blank. This machining operation gives the body 3 of the last 2 its definitive outline 22, as predetermined depending on the characteristics of the foot (size, whether right or left) and of the item of footwear to be made on this last 2.

Thus, in the end, the last 2 with a grip 4 as depicted in FIG. 4 are obtained. The method, previously described and illustrated in the drawing, makes it possible to inexpensively obtain lasts 2 with a high dimensional precision, with perfect reproducibility of their geometric characteristics. For example, the horizontal distance A between the axis of the element 7 of the grip 4 and the rearmost point of the heel of the last 2 can be obtained with great precision, as can the vertical distances, such as that marked B, i.e. the height of the body 3 of the last 2. The fact that the upper surface 14 of the insert 10 lies in the plane of the upper surface 5 of the body 3 is important here, since this plane serves as a support for the grip 4, and thus as a heightwise reference.

The details of the insert, the shape of the grip device or the accessories borne by this device may give rise to variants.

The invention claimed is:

1. A method for obtaining a last manufacturing footwear, the last being provided with a grip device so that the last can be grasped and/or immoblized by complementary external members, said method comprising:
   making a blank for the last, by casting a material in a mold inside which an insert has been placed beforehand, this insert being designed to receive elements of the grip device;
   next, putting the grip device in place by attaching the grip device to the insert;
   finally, finishing the blank by machining, to give the last a definitive shape, using the elements of the grip device, which are attached to the insert, as a support and spatial reference for said machining operation.

2. A method as claimed in claim 1, wherein:
   the insert is a metal part in which are made two parallel tapped holes designed to receive two parallel elongate elements with threaded ends belonging to the grip device, and
   the insert is held in place in the mold by threaded rods screwed respectively into its two tapped holes.

3. An automatic or semi-automatic footwear manufacturing installation using the method according to claim 1.

4. The method as claimed in claim 1, wherein the last is made of resin.

5. The method as claimed in claim 1, wherein an upper surface of the insert is level with an upper surface of a body of the last, the upper surface of the body serving as a support surface for the grip device.

* * * * *